April 5, 1949.　　　　S. H. STONER ET AL　　　　2,466,061
SEAT FOR AIRCRAFT
Filed March 23, 1945
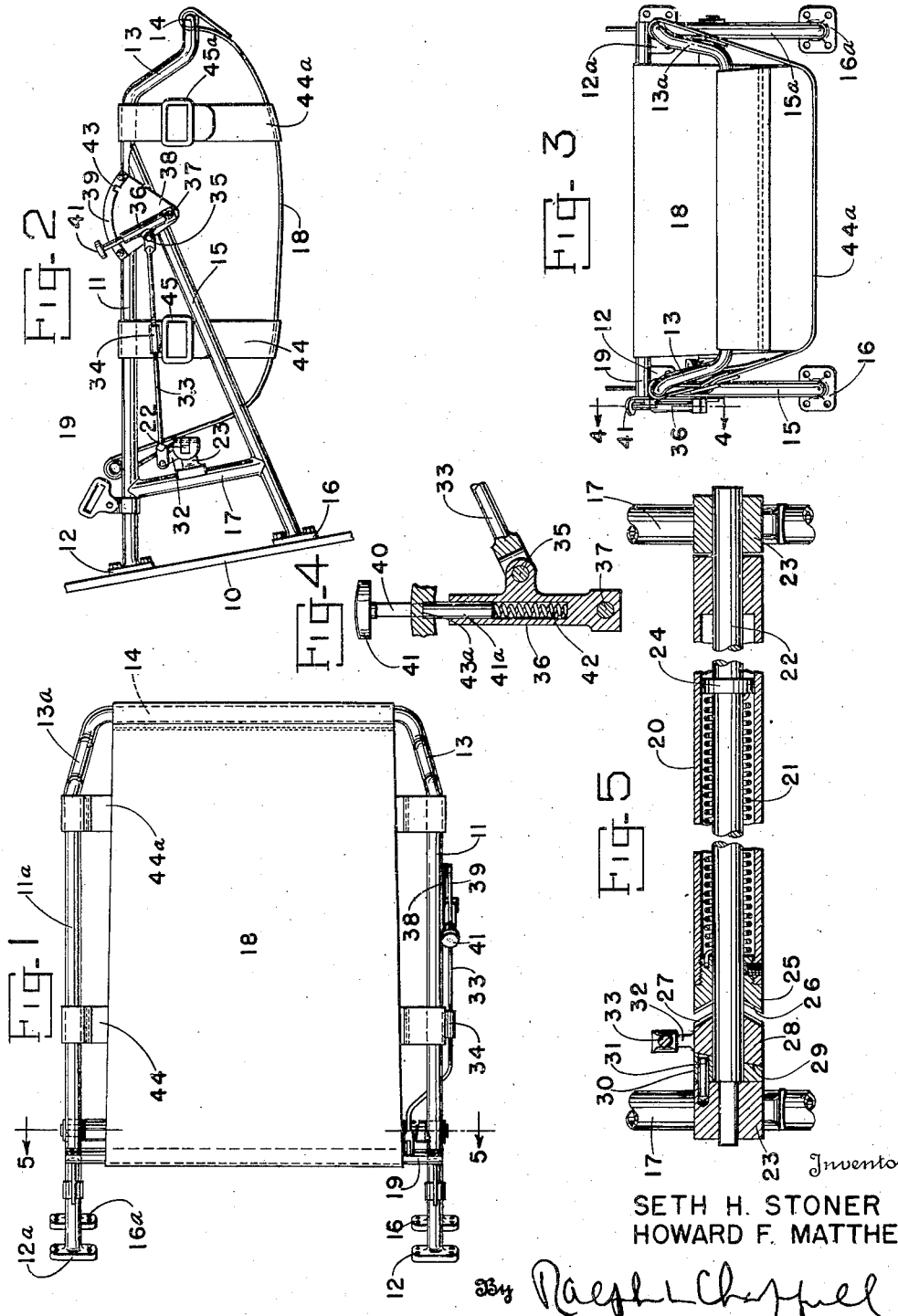
Inventors
SETH H. STONER
HOWARD F. MATTHEWS
By Ralph L. Chappell
Attorney Patented Apr. 5, 1949

2,466,061

UNITED STATES PATENT OFFICE 2,466,061

SEAT FOR AIRCRAFT

Seth H. Stoner and Howard F. Matthews,
United States Navy

Application March 23, 1945, Serial No. 584,480

3 Claims. (Cl. 155—119)

(Granted under the act of March 3, 1883, as
amended April 30, 1928; 370 O. G. 757)

The present invention relates to new and useful improvements in vehicle seats, and more particularly to improvements in seats, such as, for example, pilot seats for military and naval aircraft.

The invention generally contemplates the provision of an aircraft seat including a frame structure secured to the armor plate behind the pilot or to other suitable structural parts of the aircraft and a seat portion supported by the frame structure for adjustment relative thereto.

An object of the present invention is to provide a vehicle seat of the above type wherein the seat portion is adjustable relative to the frame structure to properly accommodate the occupant.

A further object of the invention is to provide a vehicle seat of the above type wherein the seat portion is in the form of a flexible sheet secured to the frame structure with one end connected to a spring take-up roller whereby to permit adjustment of the said seat portion.

The above and other objects of the invention will in part be obvious and will be hereinafter more fully pointed out.

In the accompanying drawing:

Fig. 1 is a top plan view of the seat assembly.

Fig. 2 is a side elevation of the seat assembly.

Fig. 3 is a front elevation of the same.

Fig. 4 is an enlarged detail sectional view, taken along the line 4—4 of Fig. 3, showing the operating lever.

Fig. 5 is an enlarged longitudinal sectional view, taken along the line 5—5 in Fig. 1, showing the roller and the locking mechanism therefor.

Referring more in detail to the accompanying drawing, the armor plate 10 within the cockpit of an aircraft is illustrated in part. The frame structure is in the form of a substantially U-shaped tubular member having leg portions 11, 11a carrying at the rear ends thereof bracket plates 12, 12a, respectively, which are suitably secured to the armor plate 10. The forward ends of the leg portions are downwardly bent, as at 13, 13a, and then extend forwardly to the closed end portion 14 of the frame structure. Tubular bracing struts 15, 15a are joined at the forward ends thereof to the leg portions 11, 11a, respectively, in rear of the downwardly bent forward ends 13, 13a of the leg portions. These struts extend rearwardly and downwardly and carry plates 16, 16a which are also suitably secured to the armor plate 10 in order to provide additional support for the frame structure. For further strengthening, braces 17 are provided between the leg portions and the struts.

The seat portion 18 is illustrated as being in the form of a sheet or strip of canvas or other suitable material having the forward end thereof looped over and supported by the end portion 14 of the frame. The flexible sheet extends rearwardly between the leg portions of the frame and may be trained over a tubular cross rod 19 which may be welded or otherwise suitably secured to the frame structure and which may, if desired, be in the form of an idler roller suitably carried on the leg portions. The sheet then extends downwardly and is secured to a spring take-up roller 20 having a coil spring 21 normally tending to rotate the same in a direction to effect winding of the sheet thereon. As shown in Fig. 5, the spring is disposed around a stationary supporting shaft 22 fixed against rotation as by press fitting or the like, in brackets 23 which are carried by the braces 17. One end of the spring is secured to an annulus 24 on the stationary shaft and the opposite end thereof is secured to a plug 25 closing the end of the roller 20. Thus, the spring constantly urges the roller in a winding direction. The sheet 18 may, if desired, be directly supported by the roller 20 without employing the cross rod 19.

To maintain the sheet in its various positions of adjustment, there is provided a locking mechanism for the roller. This mechanism may be of any suitable type but one form is illustrated herein, reference being made to Figs. 4 and 5 of the accompanying drawing. The end face of the plug 25 is provided with teeth 26 which are adapted to mesh with similar teeth 27 on the adjacent end face of a collar 28 which is carried by the shaft 22 for limited sliding and rotary movement relative thereto. The opposite end face 29 of the collar 28 is inclined to provide a camming surface which is adapted to cooperate with a cam member 30 secured against rotation by a key 31 fitting in recesses in the cam member and the adjacent bracket 23. The collar is provided with a radially extending arm 32 to which a link 33 is pivotally secured. The link extends forwardly and may be made in two parts connected by a turnbuckle 34 for purposes of adjustment. The forward end of the link is pivotally connected, as at 35, to an operating lever 36 pivoted, as at 37, to a segment 38 which is suitably mounted on the frame structure in a position wherein the lever is readily accessible to the occupant. The arcuate edge of the segment is formed by an outwardly offset arcuate rail portion 39 which extends through a slot 40 in the handle portion 41 of the lever 36. The handle portion 41 is in the form of a plunger latch fitting in the lever but normally urged outwardly with respect thereto by a spring 42. The rail portion is provided with downwardly open recesses 43, 43a near the ends thereof for receiving the upwardly projecting latch portion 41a of the handle 41 under the influence of the spring 42 for locking the lever 36 in selected positions.

In order to adjust the seat as desired by the occupant, the handle 41 may be depressed against the influence of the spring 42 in order to remove the latching portion 41a from the recess 43 and permit shifting of the lever to the unlocked position shown in Figs. 2 and 5 with the latching portion 41a seated in the recess 43a. This movement of the lever, acting through the link 33 and arm 32, will cause rotation of the collar 28 so that the relative positions of the cam faces 29, 30 will permit outward movement of the collar on the shaft 22. This outward movement is effected by the force of the spring 21 tending to rotate the roller 20 in a winding direction which will act through the teeth 26, 27 to effect separation thereof. The occupant can raise himself slightly and the spring roller 20 will act to elevate the seat portion to the desired position. On the other hand, the occupant can depress the seat portion by maintaining sufficient weight thereon to overcome the winding action of the spring. When the seat portion has been shifted to adjusted position, the latch portion 41a is depressed to clear the recess 43a and the lever 36 is then shifted forward so that the latch portion 41a will engage in the recess 43. This movement of the lever, acting through the arm 32 and link 33, will rotate the collar 28 in the opposite direction so that the cooperating cam faces 29, 30 will react to shift the collar inwardly to a position with the teeth 26, 27 in positive locking engagement.

If desired, flexible straps 44, 44a may be employed to give additional support to the occupant. Such straps, if employed, extend transversely beneath the flexible seat portion adjacent the front and rear ends thereof and may be secured in adjusted positions by conventional buckles 45, 45a, respectively, or the like. Any suitable type of back or head support for the pilot may be employed.

From the foregoing description it will be seen that the present invention provides an extremely simple seat construction which may be readily adjusted to suit the needs of the pilot or other occupant. While one form of the invention has been shown for purposes of illustration, it is to be clearly understood that various changes in the details of constructions and arrangement of parts may be made without departing from the scope of the invention as set forth in the appended claims.

The invention described herein may be manufactured and used by or for the Government of the United States of America for governmental purposes without the payment of any royalties thereon or therefor.

We claim:

1. A seat for aircraft comprising a substantially horizontal frame structure adapted to be secured to a fixed part of the aircraft, a seat portion substantially in the form of a flexible sheet secured to the forward end of said frame structure, a spring take-up roller secured to the rear of said frame structure and on which said sheet is wound whereby to permit adjustment of the seat portion as desired by the occupant, mechanism for releasably locking said roller against rotation and including a shiftable operating lever and link, and means for detachably holding said lever in preselected locking and unlocking positions.

2. In a seat of the class described, a stationary upright member, a substantially horizontal U-shaped frame having the ends of its parallel arms rigidly secured to said stationary member, a pair of bracing struts secured to said member below said arms and inclined upwardly into rigid interconnection with the forward ends of said arms, means rigidly joining the rearward portions of said arms and struts at each side and a horizontal cross bar joining the rearward portions of said arms, a spring take-up roller mounted on said means, and a flexible sagging seat proper secured at one end to the cross portion of said frame and having its other end passed over said cross bar and thence downwardly into connection with said roller.

3. In the combination defined in claim 2, a lever connected to said frame and one of said struts adjacent the forward end of the latter, locking means for adjustably positioning said roller, and a linkage connected between said lever and said locking means.

SETH H. STONER.
HOWARD F. MATTHEWS.

REFERENCES CITED

The following references are of record in the file of this patent:

UNITED STATES PATENTS

| Number | Name | Date |
|---|---|---|
| 224,319 | Allen | Feb. 10, 1880 |
| 322,354 | Davey | July 14, 1885 |
| 614,235 | Palmer | Nov. 15, 1898 |
| 1,856,534 | Boery | May 3, 1932 |
| 2,291,247 | McArthur | July 28, 1942 |

FOREIGN PATENTS

| Number | Country | Date |
|---|---|---|
| 252,491 | Great Britain | June 3, 1926 |